(12) United States Patent
Tachibana et al.

(10) Patent No.: US 8,436,708 B2
(45) Date of Patent: May 7, 2013

(54) MULTILAYER INDUCTOR AND POWER CONVERTER COMPRISING IT

(75) Inventors: Takeshi Tachibana, Tottori (JP); Satoru Tanaka, Tottori (JP)

(73) Assignee: Hitachi Metals, Ltd., Tokyo (JP)

( * ) Notice: Subject to any disclaimer, the term of this patent is extended or adjusted under 35 U.S.C. 154(b) by 171 days.

(21) Appl. No.: 12/810,351

(22) PCT Filed: Dec. 25, 2008

(86) PCT No.: PCT/JP2008/073621
§ 371 (c)(1),
(2), (4) Date: Jun. 24, 2010

(87) PCT Pub. No.: WO2009/081984
PCT Pub. Date: Jul. 2, 2009

(65) Prior Publication Data
US 2010/0283447 A1   Nov. 11, 2010

(30) Foreign Application Priority Data
Dec. 25, 2007   (JP) .................................. 2007-332358

(51) Int. Cl.
*H01F 5/00* (2006.01)
*H01F 27/28* (2006.01)
(52) U.S. Cl.
USPC ......................................... 336/200; 336/232
(58) Field of Classification Search .................. 336/200, 336/232
See application file for complete search history.

(56) References Cited

U.S. PATENT DOCUMENTS

| 6,695,972 B2 * | 2/2004 | Wang et al. ................. 252/62.63 |
| 2004/0140877 A1 * | 7/2004 | Nakao et al. ................... 336/200 |
| 2005/0062576 A1 * | 3/2005 | Asakura et al. ................ 336/233 |
| 2007/0182519 A1 * | 8/2007 | Tsuzuki et al. ................ 336/200 |

FOREIGN PATENT DOCUMENTS

| JP | 3819686 | | 9/1963 |
| JP | 4843716 | | 12/1973 |
| JP | 59088370 | A * | 5/1984 |
| JP | 09-270314 | A | 10/1997 |
| JP | 2002-141215 | A | 5/2002 |
| JP | 2005097085 | A | 4/2005 |
| JP | 2006-151702 | A | 6/2006 |
| JP | 2006-202880 | A | 8/2006 |
| JP | 2006-232647 | A | 9/2006 |

* cited by examiner

*Primary Examiner* — Mohamad Musleh
*Assistant Examiner* — Tsz Chan
(74) *Attorney, Agent, or Firm* — Sughrue Mion, PLLC

(57) ABSTRACT

A multilayer inductor comprising a coil embedded in a magnetic portion, and a magnetic gap formed by a non-magnetic portion in part of a magnetic path, the magnetic portion being made of Ni ferrite, whose relative temperature coefficient $\alpha\mu_{ir}$ of initial permeability at a frequency of 1 MHz is more than +10 ppm/°C. and +40 ppm/°C. or less between −40° C. and +80° C., the non-magnetic portion being made of Zn ferrite containing more Zn than in the magnetic portion and having a Curie temperature Tc of −50° C. or lower, and the Zn content changing continuously in boundary regions between the non-magnetic portion and the magnetic portion, whereby the thickness of the magnetic gap changes with the temperature.

5 Claims, 10 Drawing Sheets

MULTILAYER INDUCTOR AND POWER CONVERTER COMPRISING IT

FIELD OF THE INVENTION

The present invention relates to a multilayer inductor having a magnetic gap, and a power converter comprising such a multilayer inductor.

BACKGROUND OF THE INVENTION

Many of various mobile electronic appliances such as cell phones, mobile information terminals PDA, note-type computers, DVD players, CD players, MD players, digital cameras, digital video cameras, etc. comprise batteries as power supplies, and DC/DC converters as power converters for converting power supply voltage to the predetermined operation voltage. The power supplies are conventionally disposed near input terminals and connected to loads of semiconductors (IC), etc., but recently problems such as response delay to current change due to the voltage reduction and current increase of semiconductors, voltage drop by wiring, and circuit impedance increase arise in a concentrated power supply system. Accordingly, a concentrated power supply system called POL (point of load), in which power supplies are disposed near loads, have got used. For instance, an isolated DC/DC converter is disposed near an input terminal, and a non-isolated DC/DC converter is disposed near a load.

FIG. 19 shows one example of non-isolated DC/DC converter circuits. This DC/DC converter is a step-down DC/DC converter comprising an input capacitor Cin, an output capacitor Cout, an inductor 1 (Lout), and an integrated semiconductor circuit IC comprising a control circuit, etc. DC input voltage Vin turns on a switching device (field effect transistor) in the integrated semiconductor circuit IC by a control signal from the control circuit. Output voltage Vout is reduced from input voltage Vin according to the formula of Vout=Ton/(Ton+Toff)×Vin, wherein Ton represents a time period in which the switching device is turned on, and Toff represents a time period in which the switching device is turned off. Even though there is variation in the input voltage Vin, stable output voltage Vout can be obtained by adjusting a ratio of Ton to Toff.

A conventional DC/DC converter circuit is a discrete circuit comprising a switching device, an integrated semiconductor circuit (active device) comprising a control circuit, and passive components such as inductors, capacitors, etc. mounted on a printed circuit board, etc., and the entire circuit has become a module for the miniaturization of electronic appliances. Higher switching speeds have become used to reduce output voltage variations, so that DC/DC converters operated at switching frequencies from 1 MHz to 5 MHz have become widely used recently, and further frequency increase has been pursued.

DC/DC converters are used in various environments, subjected to heat from the integrated semiconductor circuits IC and surrounding circuits. Accordingly, inductors in the DC/DC converters should have stable temperature characteristics. Also, because DC current superimposed with triangular-wave alternate current flows through the inductors, they should have excellent DC superimposition characteristics.

Because the voltage conversion efficiency of DC/DC converters are largely affected by loss generated in switching devices and inductors, magnetic ferrite used for inductors should have low loss near switching frequencies. Further, inductors should not suffer the variations of characteristics due to stress generated while molding resins are cured, thereby stably providing low loss.

Many of such inductors for DC/DC converters are conventionally of a so-called wire-wound type, in which copper wires are wound around ferrite cores. However, smaller wire-wound inductors make the production of cores more difficult with lower strength. Also, because magnetic fluxes leaking from the wire-wound inductors having open magnetic circuits affect surrounding circuit devices, circuit devices cannot be disposed near the inductors, making it difficult to reduce mounting areas.

As the electronic appliances such as mobile appliances are miniaturized with more functions, power supply circuits used therein are required to be smaller (smaller space and height). However, because wire-wound inductors occupy large areas and have large height, they are not adapted to the miniaturization of circuits by switching frequency increase. Accordingly, closed-magnetic-path multilayer inductors comprising conductor lines integral with magnetic ferrite to reduce leaked magnetic fluxes have got used.

Magnetic ferrite for inductors is required to have a high saturation magnetic flux density, with small change of saturation magnetic flux density and initial permeability in a use temperature range. As such magnetic ferrite, JP 2005-97085 A discloses Ni ferrite comprising 100% by weight of main components comprising 45.5-48.0% by mol of $Fe_2O_3$, 5-10% by mol of CuO, and 26-30% by mol of ZnO, the balance being substantially NiO, and 0.005-0.045% by weight (calculated as CoO) of cobalt oxide as a sub-component, both absolute values of a relative temperature coefficient of initial permeability ($\alpha\mu_{ir}$) between −40° C. and +20° C. and $\alpha\mu_{ir}$ between 20° C. and 160° C. being 3 ppm/° C. or less, its quality coefficient (Q value) at 100 kHz being 170 or more, and its absolute value of stress resistance characteristics being 5% or less. Though this Ni ferrite has stable temperature characteristics of inductance, it is insufficient in the temperature characteristics of a saturation magnetic flux density Bs important to inductors for DC/DC converters.

FIG. 20 schematically shows the magnetization curves of magnetic ferrite having a small absolute value of $\alpha\mu_{ir}$. In general, the saturation magnetic flux density Bs of magnetic ferrite decreases, as the temperature gets higher (temperature: T3>T2>T1) toward the Curie temperature Tc. Accordingly, though the temperature change of a saturation magnetic flux density is small in a low magnetic field H, it becomes drastically larger as the magnetic field H increases.

FIG. 21 shows the DC superimposition characteristics of an inductor comprising magnetic ferrite having such magnetization characteristics. Though small superimposed current Idc provides small inductance change with the temperature, large superimposed current Idc causes inductance to extremely decrease as the temperature gets higher. Accordingly, the control of DC/DC converters by feedback current is difficult, failing to achieve stable operation.

OBJECTS OF THE INVENTION

Accordingly, the first object of the present invention is to provide a multilayer inductor and a power converter suffering little inductance change with the temperature, and having excellent temperature characteristics of magnetic properties and excellent DC superimposition characteristics.

The second object of the present invention is to provide a multilayer inductor and a power converter suffering only low loss near switching frequencies.

DISCLOSURE OF THE INVENTION

The first multilayer inductor of the present invention comprises a magnetic portion, a coil embedded in the magnetic portion, and a non-magnetic portion constituting a magnetic gap for the coil, the magnetic portion being made of Ni ferrite, whose relative temperature coefficient $\alpha\mu_{ir}$ of initial permeability at a frequency of 1 MHz is more than +10 ppm/°C. and +40 ppm/°C. or less between −40°C. and +80°C., the non-magnetic portion being made of Zn ferrite containing more Zn than in the magnetic portion and having a Curie temperature Tc of −50°C. or lower, and the Zn content changing continuously in boundary regions between the non-magnetic portion and the magnetic portion, whereby the thickness of the magnetic gap changes with the temperature.

In the boundary region in which the Zn content changes continuously, increase in the Zn content provides decrease in the Curie temperature Tc and increase in the initial permeability, thereby making the permeability higher on the non-magnetic portion side than the magnetic portion side.

The second multilayer inductor of the present invention comprises a magnetic portion constituted by pluralities of magnetic layers, a coil constituted by pluralities of conductor layers connected in a lamination direction in the magnetic portion, and a non-magnetic portion provided inside and/or outside the coil for constituting a magnetic gap for the coil, the magnetic portion being made of Co-containing Ni ferrite, the non-magnetic portion being made of Zn ferrite containing more Zn than in the magnetic portion and non-magnetic at the use temperature of the multilayer inductor, and boundary regions between the magnetic portion and the non-magnetic portion becoming non-magnetic as the use temperature of the multilayer inductor is elevated.

The third multilayer inductor of the present invention comprises a magnetic portion, a coil embedded in the magnetic portion, and a non-magnetic portion constituting a magnetic gap for the coil, the magnetic portion being made of Ni ferrite, whose relative temperature coefficient of initial permeability at a frequency of 1 MHz is more than +10 ppm/°C. and +40 ppm/°C. or less between −40°C. and +80°C., the non-magnetic portion being made of Zn ferrite containing more Zn than in the magnetic portion and having a Curie temperature Tc of −50°C. or lower, the change ratio of initial inductance at superimposed current of 0 A being within ±7% between −40°C. and +85°C.

In the first to third multilayer inductors, the above magnetic portion is preferably made of Ni ferrite comprising as main components 45-50% by mol of $Fe_2O_3$, 15-30% by mol of ZnO, 5-15% by mol of CuO, and more than 0% and 1.2% or less by mol of CoO, the balance being NiO.

The magnetic portion may contain as sub-components, 3% or less by mass (calculated as $SnO_2$) of Sn and/or 1% or less by mass (calculated as MnO) of Mn, based on 100% by mass of the main components.

The non-magnetic portion is made of Zn ferrite containing more Zn than in the magnetic portion. The preferred main component composition of such Zn ferrite comprises 43-50% by mol of $Fe_2O_3$, 37-50% by mol of ZnO, and 0-15% by mol of CuO. The Zn ferrite preferably has a Curie temperature Tc of −50°C. or lower. When the non-magnetic portion is made of the same spinel as the magnetic portion, cracking due to the difference of a thermal expansion coefficient in boundaries is unlikely.

The power converter of the present invention comprises the above multilayer inductor, a switching device, and a control circuit for the switching device.

DESCRIPTION OF THE PREFERRED EMBODIMENTS

[1] Multilayer Inductor
(a) Structure

Figure 1:
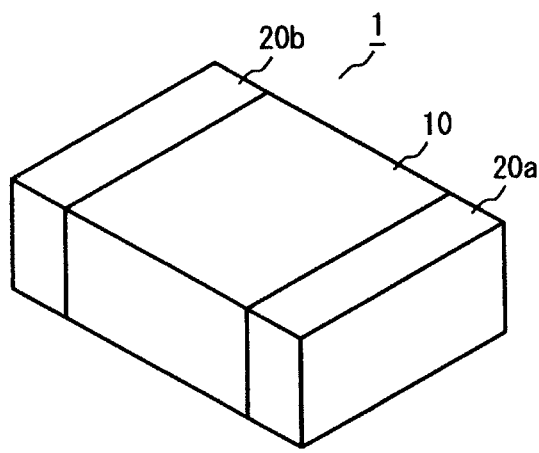
FIG. 1 is a perspective view showing the appearance of a multilayer inductor according to one embodiment of the present invention.
Figure 2:
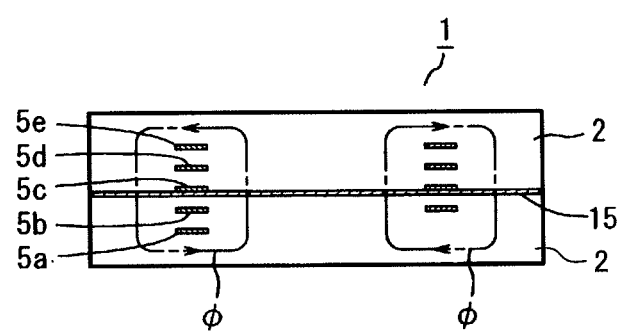
FIG. 2 is a cross-sectional view showing a multilayer inductor according to one embodiment of the present invention.
Figure 3:
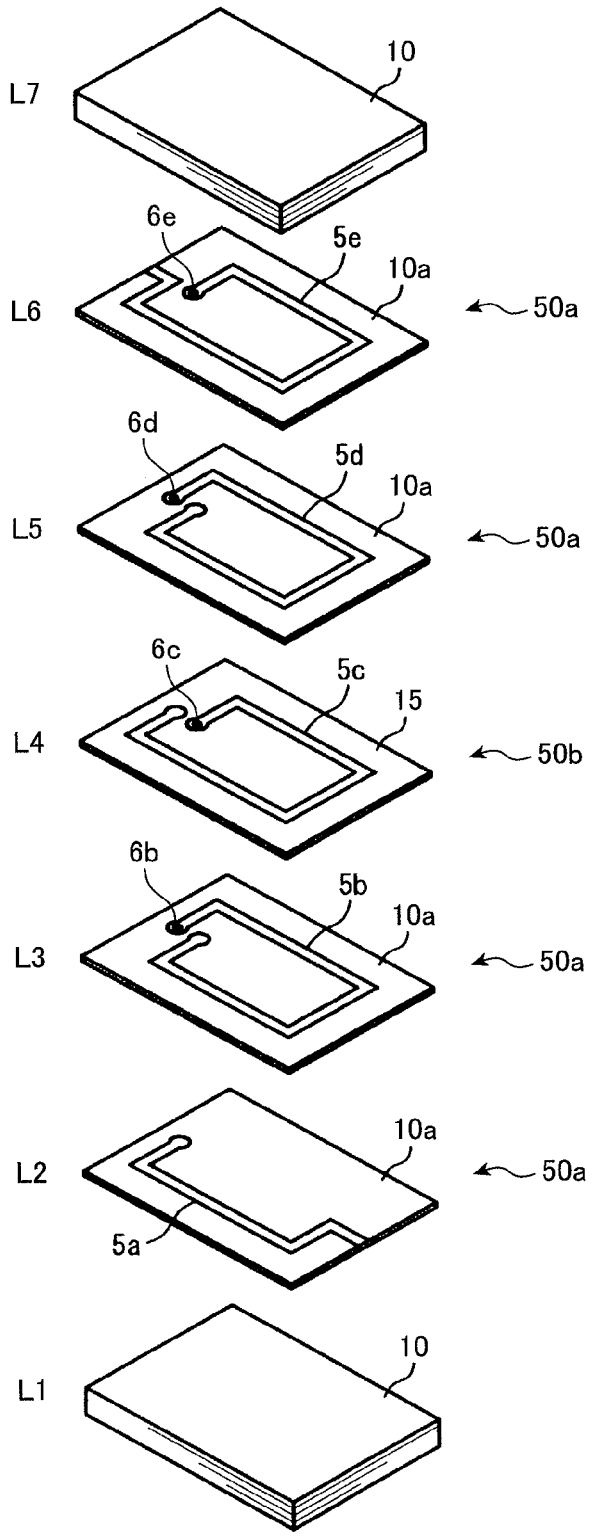
FIG. 3 is an exploded perspective view showing the laminate structure of a multilayer inductor according to one embodiment of the present invention.

The multilayer inductor according to one embodiment of the present invention shown in FIGS. 1-3 comprises a coil constituted by conductor patterns $5a$-$5e$ embedded in a laminate 1 and connected to each other, and both ends of the coil are connected to external terminals $20a$, $20b$ formed by baking a conductor paste of Ag, etc. on a surface of the laminate 1. As shown in FIG. 2, the laminate 1 comprises a magnetic portion 2 having pluralities of conductor patterns $5a$-$5e$ constituting the coil, and a non-magnetic ceramic layer (non-magnetic portion) 15 constituting a magnetic gap for the coil at a position in contact with the conductor pattern $5c$. Ends of the non-magnetic portion 15 are exposed to side surfaces of the laminate 1. Although this multilayer inductor has an open magnetic circuit structure having magnetic gaps both inside and outside the coil, there may be a non-magnetic portion 15 only inside or outside the coil, or there may be pluralities of non-magnetic layers. The positions of the external terminals are not restricted to both ends of the laminate 1.

The magnetic portion 2 is preferably formed by Ni ferrite having a relative temperature coefficient $\alpha\mu_{ir}$ of initial permeability of more than +10 ppm/°C. and +40 ppm/°C. or less at a frequency of 1 MHz between −40°C. and +80°C. This Ni ferrite comprises as main components 45-50% by mol of $Fe_2O_3$, 15-30% by mol of ZnO, 5-15% by mol of CuO, and more than 0% and 1.2% or less by mol of CoO, the balance being NiO.

When $Fe_2O_3$ is less than 45% by mol, the Ni ferrite has large core loss and low permeability. When $Fe_2O_3$ is more than 50% by mol, the Ni ferrite is not fully sintered at 960°C. or lower, resulting in reduced mechanical strength. $Fe_2O_3$ is more preferably 47-49.5% by mol.

ZnO contributes to improvement in permeability. When ZnO is less than 15% by mol, the $\alpha\mu_{ir}$ is more than +40 ppm/°C. at −40°C. to +80°C., with large inductance change with the temperature. More than 30% by mol of ZnO results in large core loss, resulting in a saturation magnetic flux density of less than 300 mT at a high temperature (120°C.). ZnO is more preferably 17-27% by mol.

When CuO is less than 5% or more than 15% by mol, the saturation magnetic flux density Bs is low. CuO contributes to lowering the sintering temperature, and less than 5% by mol of CuO results in an insufficient sintering density. CuO is more preferably 7-12% by mol.

CoO increases the magnetostriction constant, lowers the initial permeability under no stress, and increases initial permeability change due to the temperature and stress. Because $Co^{2+}$ has a positive crystal magnetic anisotropy constant, its solid solution with Ni ferrite having a negative magnetic anisotropy constant reduces the magnetic anisotropy constant of Ni ferrite, particularly reducing the core loss at as high frequencies as 1 MHz or more. Accordingly, the addition of CoO can adjust the relative temperature coefficient $\alpha\mu_{ir}$ of initial permeability, and reduce the core loss at high frequencies. However, when CoO exceeds 1.2% by mol, the magnetic anisotropy constant becomes too large on the positive side, resulting in large core loss and $\alpha\mu_{ir}$ of more than +40 ppm/°C. at −40°C. to +80°C. CoO is more preferably 0.2-1.2% by mol.

NiO is in a remaining amount obtained by subtracting the amounts of $Fe_2O_3$, ZnO, CuO and CoO from the main component composition. To obtain the desired permeability and high saturation magnetic flux density, a molar ratio of NiO/CuO is preferably 0.3-5.8.

The Ni ferrite may contain as sub-components 3% or less by mass (calculated as $SnO_2$) of Sn and/or 1% or less by mass (calculated as MnO) of Mn, based on 100% by mass of the main components.

Sn is dissolved in crystal grains as stable tetravalent ions, resulting in decrease in lattice strain to reduce the saturation magnetostriction constant ks and the magnetic anisotropy constant, thereby suppressing inductance change and core loss increase due to stress. The addition of 3% or less by mass of $SnO_2$ can suppress the drastic change of a magnetic anisotropy constant at use temperatures, and adjust decrease in the magnetic anisotropy constant depending on decrease in the saturation magnetic flux density, thereby adjusting the relative temperature coefficient $\alpha\mu_{ir}$ of initial permeability. More than 3% by mass of $SnO_2$ leads to insufficient sinterability, resulting in poor magnetic properties such as permeability. $SnO_2$ is more preferably 0.2-2.0% by mass.

The addition of Mn reduces lattice strain, increases initial permeability μi, alleviates the non-linearity of a B-H loop, and reduces coercivity Hc in a minor loop. More than 1% by mass of MnO deteriorates the sinterability, resulting in poor stress characteristics of core loss. MnO is more preferably 0.2-0.8% by mass.

In the case of a small multilayer inductor with a magnetic gap, small initial permeability necessitates the coil to have an increased number of winding to obtain the desired inductance, resulting in increased DC resistance Rdc. Accordingly, the initial permeability of Ni ferrite constituting the magnetic portion is preferably 70 or more, more preferably 100 or more.

In the multilayer inductor of the present invention, the magnetic gap length changes depending on the temperature. The matching of the change of the magnetic gap length with the relative temperature coefficient $\alpha\mu_{ir}$ of initial permeability of the magnetic portion can reduce inductance change with the temperature. In the structure of the present invention in which the magnetic gap length changes with the temperature, there is large inductance change when the relative temperature coefficient $\alpha\mu_{ir}$ of initial permeability of the magnetic portion is +10 ppm/°C. or less or more than +40 ppm/°C.

The non-magnetic portion 15 constituting a magnetic gap for shielding a magnetic flux $\phi$ is preferably formed by Zn ferrite containing more Zn than in the magnetic portion 2 and having a Curie temperature Tc of −50°C. or lower. The preferred main component composition of such Zn ferrite comprises 43-50% by mol of $Fe_2O_3$, 37-50% by mol of ZnO, and 0-15% by mol of CuO. The more preferred main component composition of the Zn ferrite comprises 47-49.5% by mol of $Fe_2O_3$, 40-50% by mol of ZnO, and 7-12% by mol of CuO. With the non-magnetic portion formed by the same spinel as in the magnetic portion, cracking due to the difference of a thermal expansion coefficient in boundaries is unlikely. It may further contain Co diffused from the magnetic portion 2.

Although a multilayer inductor is conventionally provided with a magnetic gap of non-magnetic Zn ferrite to improve DC superimposition characteristics, there has been no example of improving the temperature characteristics of inductors by such structure of the present invention.

Boundary regions between the magnetic portion and the non-magnetic portion is formed by the diffusion of part of Zn contained in the non-magnetic material forming a non-magnetic portion of the inductor to the magnetic portion during sintering. Because the Zn content continuously changes (decreases) from the non-magnetic portion to the magnetic portion in the boundary between the non-magnetic portion and the magnetic portion, the Curie temperature Tc also continuously changes, so that the magnetic gap length in a magnetic circuit also changes with the temperature.

Figure 4A:
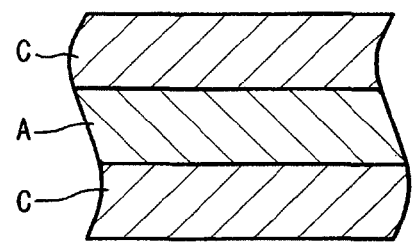
FIG. 4(a) is a partial cross-sectional view showing a region including a non-magnetic portion in the multilayer inductor of the present invention before sintering.
Figure 4B:
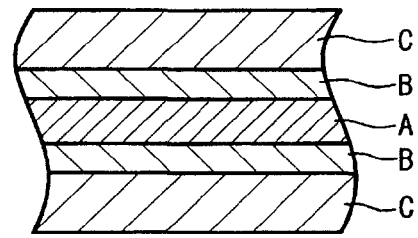
FIG. 4(b) is a partial cross-sectional view showing a region including a non-magnetic portion in the sintered multilayer inductor of the present invention.

FIGS. 4(a) and 4(b) show the cross section of a laminate before and after sintering, which is used for the multilayer inductor of the present invention. When the laminate shown in FIG. 4(a), in which a non-magnetic portion A is sandwiched by magnetic portions C, is sintered, Zn diffuses from the non-magnetic portion A to the magnetic portions C, resulting in decrease in the Zn content in the non-magnetic portion A, and increase in the Zn content in the magnetic portions C. As a result, a boundary region B in which the Zn content continuously changes is formed in a boundary between the non-magnetic portion A and the magnetic portion C [FIG. 4(b)].

Figure 5:
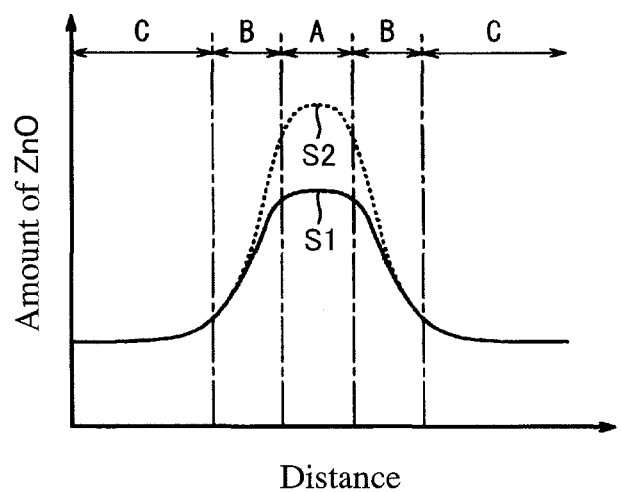
FIG. 5 is a graph showing the diffusion of ZnO in a region including a magnetic gap in the multilayer inductor of the present invention.

FIG. 5 shows a Zn content distribution in a region including a magnetic gap. The Zn content gradually decreases from the higher-concentration non-magnetic portion A to the lower-concentration magnetic portion C in each boundary region B between the non-magnetic portion A and the magnetic portion C. Sample S1 shown by a solid line in the figure and Sample S2 shown by a broken line differ in the Zn content in the non-magnetic portion A. Because large difference in the Zn content between the non-magnetic portion A and the magnetic ferrite portion C results in large inclination of the Zn content in the boundary regions B, the Curie temperature Tc changes drastically. Because Sample S2 contains more Zn near the non-magnetic portion A, its magnetic gap is thicker than that of Sample S1 at low temperatures.

Figure 6:
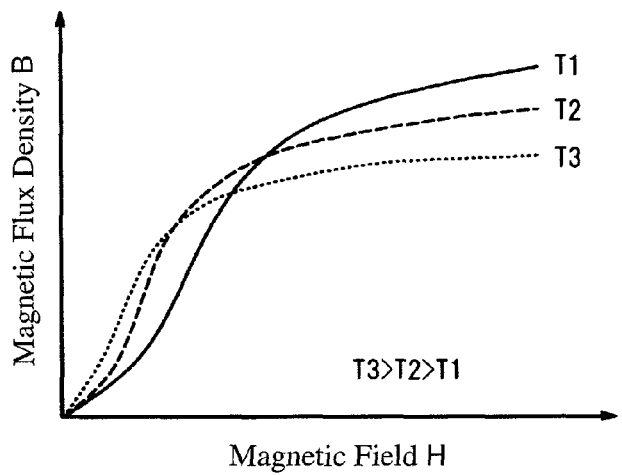
FIG. 6 is a graph showing the magnetization curves of ferrite having a large relative temperature coefficient of initial permeability.

FIG. 6 schematically shows the magnetization curves of magnetic ferrite having a large absolute value of $\alpha\mu_{ir}$ for the magnetic portion C. Such magnetic ferrite tends to have a saturation magnetic flux density, which is larger at higher temperatures in a low magnetic field, and larger at lower temperatures in a high magnetic field.

Figure 7:
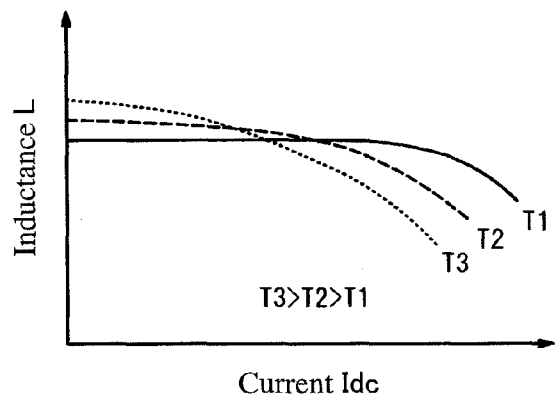
FIG. 7 is a graph showing the DC superimposition characteristics of an inductor formed by ferrite having a large relative temperature coefficient of initial permeability.
Figure 8:
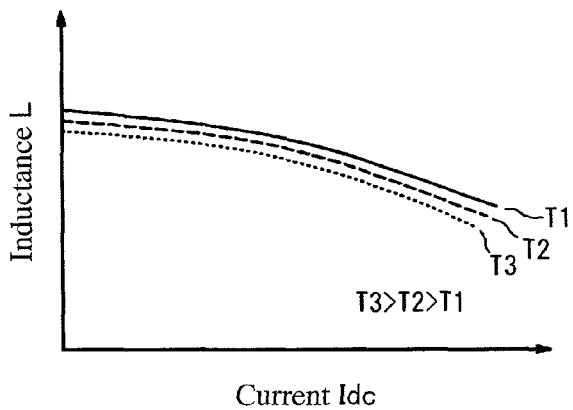
FIG. 8 is a graph showing the DC superimposition characteristics of the multilayer inductor of the present invention.

FIG. 7 shows the DC superimposition characteristics of an inductor using magnetic ferrite having such magnetization characteristics. Higher superimposed current Idc and higher temperatures provide lower inductance. Because of large $\alpha\mu_{ir}$, there is large inductance change with the temperature even at small superimposed current Idc, failing to obtain stable characteristics. However, by having a structure in which the Curie temperature Tc continuously changes in boundaries between the non-magnetic portion A and the magnetic portion C, and by properly matching the magnetic gap thickness change with the temperature due to the Zn content between the non-magnetic portion A and the boundary region B with the relative temperature coefficient $\alpha\mu_{ir}$ of initial permeability of magnetic ferrite used for the magnetic portion C, as shown in FIG. 8, the inductor can have small inductance change with the temperature at low to high superimposed current. Also, because the effective thickness of the magnetic gap changes with the temperature, it is possible to prevent the inductance from decreasing at high temperatures and/or at large current, as compared with an inductor having a magnetic gap without the above boundary region B.

Figure 9A:
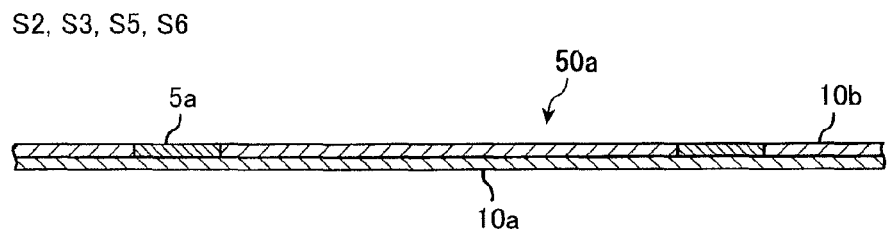
FIG. 9(a) is a cross-sectional view showing a first composite sheet used in the multilayer inductor of the present invention.

The multilayer inductor in this embodiment, as shown in FIG. 3, mainly comprises layers L2-L6 constituted by the first and second composite sheets 50a, 50b provided with ribbon-shaped conductor patterns formed by a conductor paste, and layers L1, L7 constituted by a magnetic material sheet 10. For instance, the first composite sheet 50a for the layer L2 is, as shown in FIG. 9(a), formed by printing the magnetic material sheet 10a formed on a carrier film (not shown) with a conductor pattern 5a, and printing an entire surface portion of the magnetic material sheet 10a free from the conductor pattern 5a with a magnetic material paste to form a magnetic layer 10b having the same thickness as that of the conductor pattern 5a. Other layers L3, L5 and L6 formed by the first composite sheet 50a are the same as the layer L2 except that they have different shapes of conductor patterns 5b, 5d, 5e, and that end portions of the conductor patterns 5b, 5d, 5e are provided with via-holes 6b, 6d, 6e penetrating the magnetic material sheet 10a.

Figure 9B:
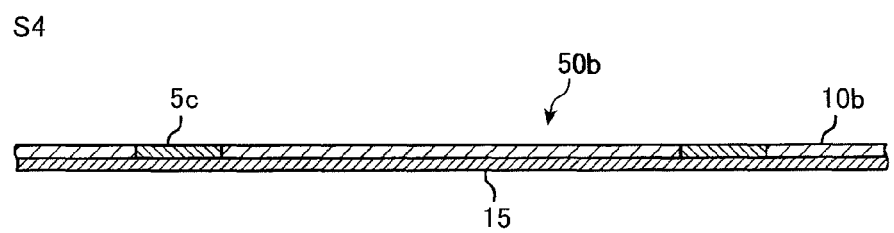
FIG. 9(b) is a cross-sectional view showing a second composite sheet used in the multilayer inductor of the present invention.

As shown in FIG. 9(b), the second composite sheet 50b for the layer L4 is formed by printing the non-magnetic material sheet 15 formed on a carrier film (not shown) with a conductor pattern 5c, and by printing an entire surface portion of the non-magnetic material sheet 15 free from the conductor pattern 5c with a magnetic material paste to form a magnetic layer 10b having the same thickness as that of the conductor pattern 5c. In the first and second composite sheets 50a, 50b, the order of printing the conductor patterns 5a-5e and the magnetic layer 10b may be reversed.

(b) Production Method (1) Formation of Magnetic Material Sheet Layer 10 (L7)

The magnetic material sheet 10a formed on a carrier film (not shown) is cut to the predetermined shape together with the carrier film, placed on a plate (not shown), and sucked on the carrier film side. The magnetic material sheet 10a similarly formed on a carrier film is laminated with the carrier film upside on the magnetic material sheet 10a on the plate, and then press-bonded. Thereafter, the carrier film is removed. Repeating this operation plural times, the magnetic material sheet layer 10 (L7) having the predetermined thickness is formed.

(2) Lamination of Layers L6, L5 of First Composite Sheet 50a

The first composite sheet 50a formed on a carrier film is laminated on the layer L7 and press-bonded to laminate a layer L6 of the first composite sheet 50a, followed by the removal of the carrier film. Similarly, the layer L5 is laminated.

(3) Lamination of Layer L4 of Second Composite Sheet 50b

The second composite sheet 50b formed on a carrier film is laminated on the layer L5 and press-bonded to laminate a layer L4 of the second composite sheet 50b, followed by the removal of the carrier film.

(4) Lamination of Layers L3, L2 of First Composite Sheet 50a

By repeating the step of laminating the first composite sheet 50a formed on a carrier film on the layer L4, press-bonding them and removing the carrier film, layers L3, L2 of the first composite sheet 50a are laminated, thereby connecting the conductor patterns 5a-5e through via-holes 6b-6e, and forming a coil with a magnetic gap of the non-magnetic layer 15 between the conductor patterns 5b, 5c.

(5) Lamination of Magnetic Material Sheet Layer 10 (L1)

Pluralities of magnetic material sheets 10a are press-bonded to the layer L2 as in the step (1), forming a magnetic material sheet layer 10 (L1) having the predetermined thickness.

The carrier film is preferably a polyester film as thick as about 50-250 µm coated with a silicone resin as a parting material. The magnetic material sheet 10a or the non-magnetic material sheet 15 is formed on the carrier film by a doctor blade method, a die coater method, a roll coater method, etc. The magnetic material sheet 10a is preferably as thick as 10-300 µm, and the non-magnetic material sheet 15 is preferably as thick as 5-200 µm to obtain the desired magnetic gap.

It is preferable industrially to form a laminate having a large number of multilayer inductors integrally connected to each other, cut it to individual multilayer inductors, sintering them at 850 to 950° C. for 1-6 hours, subjecting them to barrel polishing, and bake an Ag paste coated on both side surfaces of each multilayer inductor on which both ends of the coil appear to form external terminals 20a, 20b.

By properly adjusting sintering conditions (temperature profile such as the peak temperature, the holding time, etc.) depending on the temperature characteristics of the relative temperature coefficient $\alpha\mu_{ir}$ of initial permeability and saturation magnetic flux density of Ni ferrite used for the magnetic portion C, the diffusion of Zn in the boundary regions B is controlled.

The sintering atmosphere is determined depending on a metal material used for the conductor pattern. When the metal material suffers oxidation, the sintering atmosphere is preferably a low-oxygen atmosphere having an oxygen partial pressure of 8% or less, or an inert gas atmosphere such as $N_2$, Ar, etc.

Low-resistivity metal materials for the conductor patterns and the external terminals are preferably Ag, Pt, Pd, Au, Cu, Ni or these alloys. The magnetic material sheet 10a and the magnetic layer 10b are formed by the above Ni ferrite, and the non-magnetic material sheet 15 is formed by the above Zn ferrite.

The magnetic material sheet 10a and the magnetic layer 10b in a coil layer provided with the conductor patterns 5a-5e, and the magnetic material sheet layers 10, 10 above and below the coil layer are preferably formed by substantially the same Ni ferrite. The term "substantially the same" means "containing the same main components," and the sub-components and the crystal grain sizes may be different. Different ferrites may be used, if necessary. For instance, when the magnetic material sheet layers 10, 10 are formed by Mn ferrite having a higher saturation magnetic flux density than that of Ni ferrite, local magnetic saturation can be reduced.

Because the non-magnetic layer 15 functioning as a magnetic gap is constituted by ceramic green sheets, it has good thickness accuracy, suppressing the inductance variation of the coil. Also, by using pluralities of second composite sheets 50b, pluralities of dispersed magnetic gaps may be provided.

[2] Power Converter

The power converter of the present invention comprises the above multilayer inductor, a switching device, and a control circuit for the switching device. The inductor, the switching device, etc. may be mounted on a circuit board, or mounted on a resin substrate to form a module. Also, the switching device, etc. may be mounted on the inductor to form a module.

Figure 19:
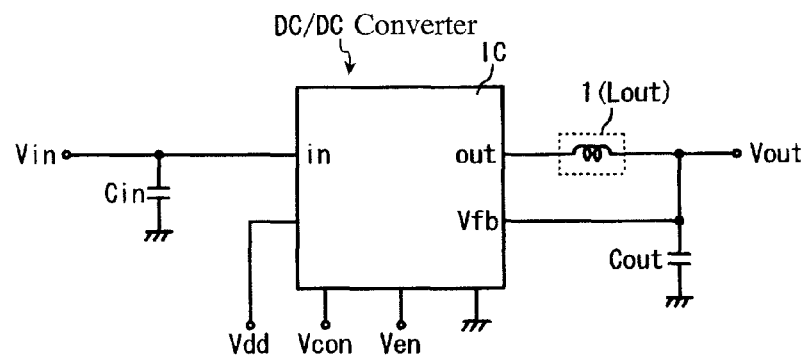
FIG. 19 is a view showing an equivalent circuit of a DC/DC converter.
Figure 20:
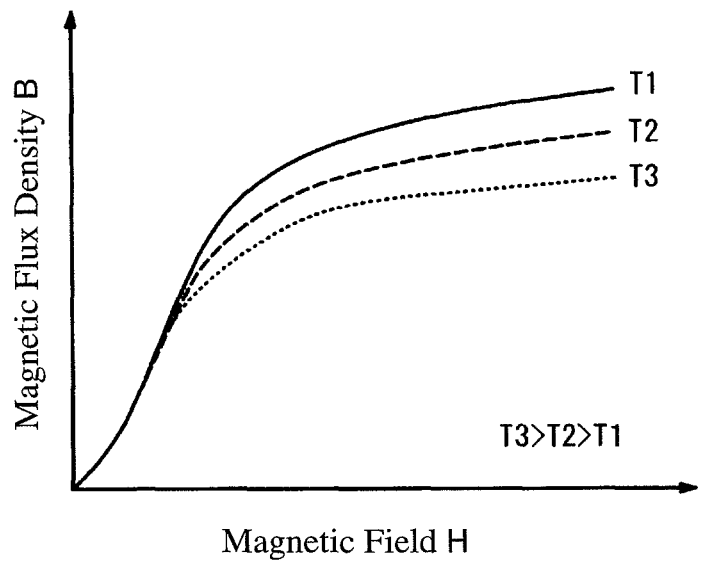
FIG. 20 is a graph showing the magnetization curves of ferrite having a small relative temperature coefficient of initial permeability.
Figure 21:
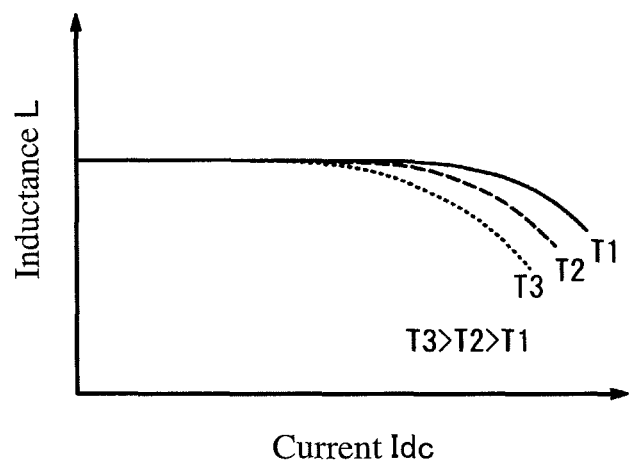
FIG. 21 is a graph showing the DC superimposition characteristics of an inductor formed by ferrite having a small relative temperature coefficient of initial permeability.

FIG. 19 shows an equivalent circuit of a step-down DC/DC converter as a power converter comprising the multilayer inductor and the integrated semiconductor circuit IC. The multilayer inductor has upper-surface electrodes on which integrated semiconductor circuit IC including the switching device and the control circuit is mounted, and rear-surface external terminals including a terminal Vcon for controlling output voltage, a terminal Ven for controlling the ON/OFF of output, a terminal Vdd for controlling the ON/OFF of the switching device, an input terminal Vin, an output terminal Vout, and a ground terminal GND, etc. The external terminals are connected to the integrated semiconductor circuit IC and the coil through electrodes formed on side surfaces of and inside the multilayer inductor. The DC/DC converter comprising the multilayer inductor of the present invention can be stably operated with excellent conversion efficiency even at high temperatures and high DC superimposed current.

The present invention will be explained in further detail by Examples below without intention of restricting the present invention thereto. Unless otherwise particularly mentioned, the thickness of each layer in the laminate is expressed by thickness after sintering.

EXAMPLE 1

[1] Ni Ferrite Constituting Magnetic Portion (a) Production

Main component powders comprising $Fe_2O_3$, ZnO, CuO, CoO and NiO and sub-component powders comprising $SnO_2$ and MnO were wet-mixed, dried, and calcined at 800° C. for 2 hours. The calcined powder was charged into a ball mill with ion-exchanged water, and pulverized to a BET specific surface area of 6.5 $m^2/g$ for about 20 hours. The pulverized calcined powder was mixed with polyvinyl alcohol, granulated by a spray drier method, molded, and then sintered at 900° C. for 2 hours in the air to form toroidal core samples each having the composition shown in Table 1, an outer diameter of 8 mm, an inner diameter of 4 mm and a thickness of 2 mm. The amounts of the main components and the sub-components were measured by X-ray fluorescence analysis and ICP optical emission spectrometry. First, the elements contained were identified by X-ray fluorescence analysis, and their amounts were quantitatively determined by a calibration method comparing with standard samples.

(b) Measurement of Magnetic Properties

The initial permeability μi, saturation magnetic flux density Bs, residual magnetic flux density Br, coercivity Hc and core loss of each sample were measured by the following methods.

(1) Initial Permeability μi 7 turns of a copper wire was wound around each toroidal core sample to form an inductor, whose inductance was measured at a frequency of 1 MHz and current of 1 mA by an LCR meter to calculate initial permeability μi by the following formula:

$$\mu i=(le \times L)/(\mu_0 \times Ae \times N^2),$$

wherein le represents magnetic length, L represents the inductance of the sample, $\mu_0$ represents permeability in vacuum=$4\pi \times 10^{-7}$H/m, Ae represents the cross section area of the sample, and N represents the number of turns of the coil.

The inductance of the toroidal core sample was them measured in a range from −40° C. to +80° C. to calculate the relative temperature coefficient $\alpha\mu_{ir}$ of the initial permeability by the flowing formula:

$$\alpha\mu_{ir}=[(\mu i2-\mu i1)/\mu i12]/(T2-T1)$$

In a range from −40° C. to +20° C., T1 is 20° C., T2 is −40° C., μi1 is initial permeability at −40° C., and μi2 is initial permeability at +20° C. In a range from +20° C. to +80° C., T1 is +20° C., T2 is +80° C., μi1 is initial permeability at 20° C., and μi2 is initial permeability at 80° C. The measurement temperature range was halved, because the sign of $\alpha\mu_{ir}$ may be reversed depending on the temperature range.

(2) Saturation Magnetic Flux Density Bs, Residual Magnetic Flux Density Br and Coercivity Hc Using a B-H analyzer, the saturation magnetic flux density Bs, residual magnetic flux density Br and coercivity Hc of each sample were measured at a frequency of 10 kHz in a magnetic field of 4 KA/m.

(3) Core Loss Pcv 5 turns of copper wires were wound around each toroidal core sample on both primary and secondary sides, to measure core loss Pcv at room temperature (25° C.) under the conditions of 5 MHz and 30 mT and 10 MHz and 30 mT, respectively.

Table 1 shows the composition, initial permeability μi and $\alpha\mu_{ir}$ of each sample, and Table 2 shows the core loss Pcv, saturation magnetic flux density Bs, residual magnetic flux density Br and coercivity Hc of each sample. Samples with * are outside the scope of the present invention.

TABLE 1

| | Main Components | | | | | Sub-Components | | | $\alpha\mu_{ir}$ (ppm/° C.) | |
| --- | --- | --- | --- | --- | --- | --- | --- | --- | --- | --- |
| | (% by mol) | | | | | (% by mass) | | | −40° C. to +20° C. | +20° C. to +80° C. |
| No. | Fe$_2$O$_3$ | ZnO | NiO | CuO | CoO | SnO$_2$ | MnO | μi[1] | | |
| 1* | 48.5 | 13.0 | 28.7 | 8.8 | 1.0 | 0.5 | 0.0 | 53 | 63.6 | 28.4 |
| 2 | 48.5 | 17.0 | 24.7 | 8.8 | 1.0 | 0.5 | 0.0 | 74 | 32.4 | 29.6 |
| 3 | 48.5 | 19.0 | 22.7 | 8.8 | 1.0 | 0.5 | 0.0 | 86 | 27.0 | 29.4 |
| 4 | 48.5 | 21.0 | 20.7 | 8.8 | 1.0 | 0.5 | 0.0 | 106 | 23.3 | 25.7 |
| 5 | 48.5 | 23.0 | 18.7 | 8.8 | 1.0 | 0.5 | 0.0 | 125 | 21.3 | 23.7 |
| 6 | 48.5 | 25.0 | 16.7 | 8.8 | 1.0 | 0.5 | 0.0 | 143 | 20.5 | 22.1 |
| 7 | 48.5 | 27.0 | 14.7 | 8.8 | 1.0 | 0.5 | 0.0 | 165 | 21.8 | 23.0 |
| 8* | 48.5 | 20.0 | 22.7 | 8.8 | 0.0 | 0.5 | 0.0 | 159 | 6.5 | 5.8 |
| 9 | 48.5 | 20.0 | 22.6 | 8.8 | 0.1 | 0.5 | 0.0 | 142 | 12.6 | 12.0 |
| 10 | 48.5 | 20.0 | 22.45 | 8.8 | 0.25 | 0.5 | 0.0 | 127 | 15.4 | 16.0 |
| 11 | 48.5 | 20.0 | 22.2 | 8.8 | 0.5 | 0.5 | 0.0 | 111 | 18.5 | 21.9 |
| 12 | 48.5 | 20.0 | 21.95 | 8.8 | 0.75 | 0.5 | 0.0 | 102 | 20.7 | 25.7 |
| 13 | 48.5 | 20.0 | 21.70 | 8.8 | 1.00 | 0.5 | 0.0 | 95 | 28.2 | 28.9 |
| 14* | 48.5 | 20.0 | 21.45 | 8.8 | 1.25 | 0.5 | 0.0 | 89 | 47.1 | 31.4 |
| 15* | 48.5 | 20.0 | 21.20 | 8.8 | 1.50 | 0.5 | 0.0 | 83 | 66.3 | 34.5 |
| 16* | 48.5 | 20.0 | 20.7 | 8.8 | 2.00 | 0.5 | 0.0 | 74 | 111.3 | 61.4 |
| 17 | 48.5 | 25.0 | 16.7 | 8.8 | 1.00 | 0.00 | 0.0 | 190 | 17.5 | 28.3 |
| 18 | 48.5 | 25.0 | 16.7 | 8.8 | 1.00 | 1.00 | 0.0 | 148 | 21.2 | 18.7 |
| 19 | 48.5 | 20.0 | 22.2 | 8.8 | 0.5 | 0.5 | 0.1 | 111 | 18.7 | 21.4 |
| 20 | 48.5 | 20.0 | 22.2 | 8.8 | 0.5 | 0.5 | 0.5 | 118 | 17.2 | 20.9 |
| 21 | 48.5 | 20.0 | 22.2 | 8.8 | 0.5 | 0.5 | 0.9 | 85 | 14.7 | 17.2 |
| 22* | 48.5 | 20.0 | 22.2 | 8.8 | 0.5 | 0.5 | 1.9 | 33 | 3.5 | 0.0 |
| 23 | 48.5 | 20.0 | 21.7 | 8.8 | 1.0 | 0.5 | 0.1 | 95 | 27.9 | 26.2 |
| 24 | 48.5 | 20.0 | 21.7 | 8.8 | 1.0 | 0.5 | 0.5 | 100 | 30.1 | 25.1 |
| 25 | 48.5 | 20.0 | 21.7 | 8.8 | 1.0 | 0.5 | 0.9 | 71 | 34.8 | 17.9 |
| 26* | 48.5 | 20.0 | 21.7 | 8.8 | 1.0 | 0.5 | 1.9 | 32 | 8.9 | −2.6 |

Note:
[1]Initial permeability.

TABLE 2

| | Pcv (kw/m$^3$) at 30 mT | | Bs (mT) | Br (mT) | Hc (A/m) |
| --- | --- | --- | --- | --- | --- |
| No. | at 5 MHz | at 10 MHz | at 4 KA/m | at 4 KA/m | at 4 KA/m |
| 1* | —[1] | — | 383 | 266 | 636 |
| 2 | — | — | 406 | 279 | 485 |
| 3 | 1605 | 8545 | 411 | 280 | 424 |
| 4 | 1503 | 8612 | 422 | 281 | 357 |
| 5 | 1768 | 11219 | 420 | 274 | 312 |
| 6 | 2197 | 17373 | 403 | 256 | 264 |
| 7 | 3109 | 45348 | 379 | 232 | 222 |
| 8* | 6026 | 21617 | 424 | 274 | 333 |
| 9 | 5126 | 19696 | 415 | 267 | 321 |
| 10 | 3920 | 15871 | 417 | 272 | 329 |
| 11 | 2808 | 12648 | 408 | 269 | 348 |
| 12 | 1967 | 9501 | 414 | 276 | 369 |
| 13 | 1370 | 7757 | 412 | 278 | 388 |
| 14* | 1115 | 6148 | 411 | 279 | 413 |
| 15* | 713 | 5549 | 399 | 271 | 410 |
| 16* | — | — | 400 | 274 | 451 |
| 17 | — | — | 439 | — | — |
| 18 | — | — | 404 | — | — |
| 19 | 3174 | 13802 | 416 | 274 | 349 |
| 20 | 3225 | 13931 | 420 | 287 | 329 |
| 21 | 6319 | 21054 | 372 | 268 | 472 |
| 22* | — | — | 255 | 177 | 978 |
| 23 | 1636 | 9010 | 412 | 279 | 385 |
| 24 | 1700 | 8689 | 416 | 289 | 367 |
| 25 | — | — | 358 | 259 | 553 |
| 26* | — | — | 250 | 173 | 1000 |

Note:
[1]Not measured.

Figure 10:
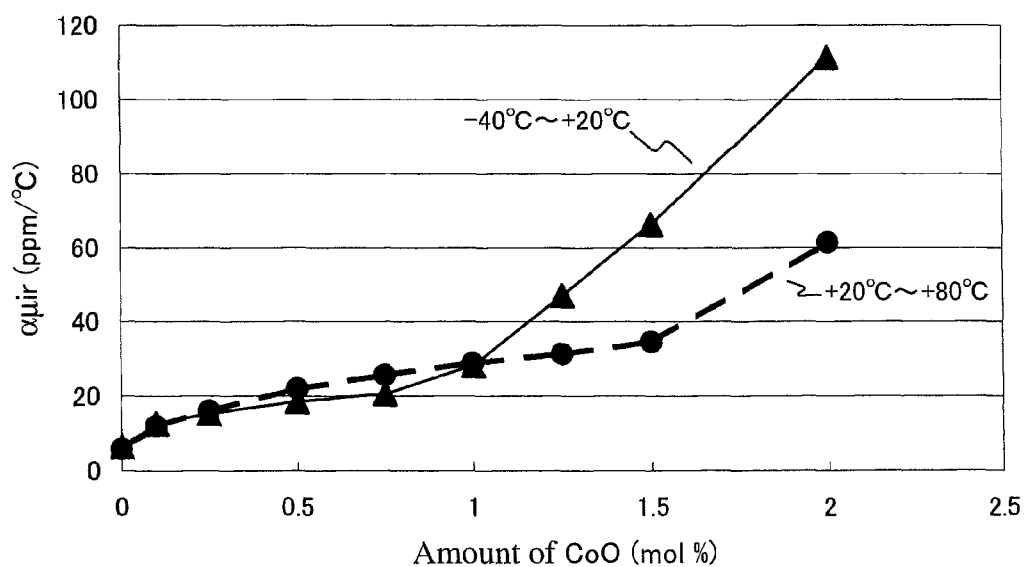
FIG. 10 is a graph showing the relation between the amount of CoO and the relative temperature coefficient $\alpha\mu_{ir}$ of initial permeability.

FIG. 10 shows the relation between the amount of CoO and $\alpha\mu_{ir}$ in Samples 8-16. Using the relation that increase in Co results in increase in $\alpha\mu_{ir}$ on the positive side, it is possible to control $\alpha\mu_{ir}$ to the desired level. $\alpha\mu_{ir}$ in a range from −40° C. to +20° C. drastically increases as CoO becomes 1.0% or more by mol, and $\alpha\mu_{ir}$ in a range from +20° C. to +80° C. drastically increases as CoO becomes 1.5% or more by mol.

Figure 11:
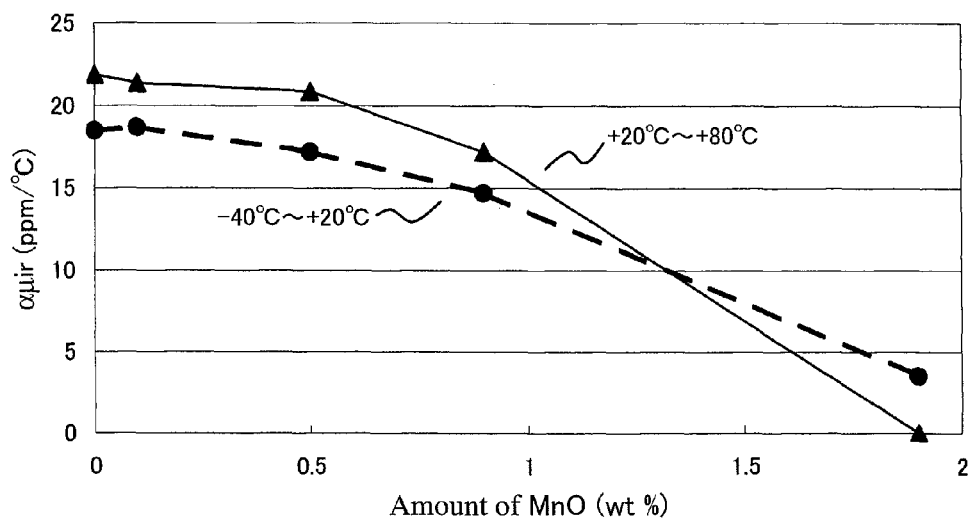
FIG. 11 is a graph showing the relation between the amount of MnO and the relative temperature coefficient $\alpha\mu_{ir}$ of initial permeability.

FIG. 11 shows the relation between the amount of MnO and $\alpha\mu_{ir}$ in Samples 11 and 19-22. When there is a small amount of Co, increase in Mn results in decrease in $\alpha\mu_{ir}$, making it possible to control $\alpha\mu_{ir}$ to the desired level while suppressing core loss.

[2] Zn Ferrite Constituting Non-Magnetic Portion 48.5% by mol of Fe$_2$O$_3$ powder, 42.7% by mol of ZnO powder, and 8.8% by mol of CuO powder were wet-mixed, dried, and calcined at 800° C. for 2 hours. The calcined powder was charged into a ball mill with ion-exchanged water, and pulverized to a BET specific surface area of 4.5 m$^2$/g for about 20 hours. The pulverized calcined powder was mixed with polyvinyl alcohol, granulated by a spray drier method, molded, and then sintered at 900° C. for 2 hours in the air to obtain toroidal core samples of Zn ferrite each having an outer diameter of 8 mm, an inner diameter of 4 mm and a thickness of 2 mm. The amounts of the main components were measured in the same manner as in Ni ferrite constituting the magnetic portion. Each sample had a Curie temperature Tc of −60° C. or lower, and initial permeability μi of substantially 1.

[3] Inductor

Starting material powders were mixed to the Ni ferrite composition of Sample 6, calcined and pulverized. The calcined powder was mixed with polyvinyl butyral and ethanol as a solvent, and blended in a ball mill to form slurry. With its viscosity adjusted, the slurry was applied onto a PET film by a doctor blade method, and dried to form a 30-μm-thick magnetic material sheet 10a. Likewise, non-magnetic material sheets 10b as thick as 10 μm, 20 μm and 30 μm, respectively, were produced from the above Zn ferrite. As shown in FIG. 3, an Ag paste was applied to these magnetic material sheets 10a and non-magnetic material sheets 10b to form 30-μm-thick conductor patterns 5a-5e, and magnetic layers 10b as thick as the conductor patterns 5a-5e were formed, sandwiched by magnetic material sheet layers 10, and press-bonded. The resultant laminate assembly was cut to a size of 2.5 mm×2.0 mm×1.0 mm, and the binder was removed at 500° C. Thereafter, the laminates were sintered at 900° C. for 3 hours in the air. External terminals 20a, 20b were formed on each sintered laminate, and baked to produce a multilayer inductors with 4.5 turns of a coil. The multilayer inductors (Samples S1-S3) thus obtained are shown in Table 3.

TABLE 3

| Sample | Ni Ferrite For Magnetic Material Sheet | Thickness Of Non-Magnetic Material Sheet |
|---|---|---|
| S1 | Sample 6 in Table 1 | 10 μm |
| S2 | Sample 6 in Table 1 | 20 μm |
| S3 | Sample 6 in Table 1 | 30 μm |

Figure 12:
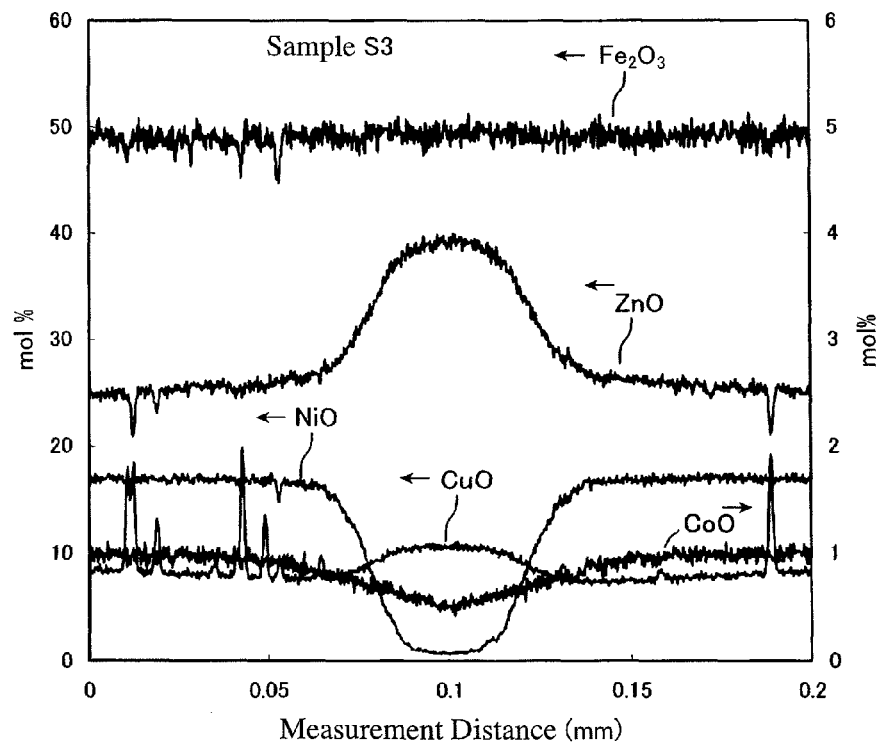
FIG. 12 is a graph showing the diffusion of ZnO in the multilayer inductor of the present invention (Sample S3).

FIG. 12 shows a Zn content distribution in a region containing a magnetic gap (non-magnetic portion) in Sample S3. The amounts of $ZnO$, $Fe_2O_3$, $CuO$, $NiO$ and $CoO$ in magnetic portions C, non-magnetic portions A and boundary regions B were measured by EPMA (electron probe X-ray microanalysis) and SEM-EDX (scanning electron microscopy/energy-dispersive X-ray spectroscopy). There were no clear boundaries between the non-magnetic portion A and the magnetic portion C, with the Zn content continuously changing. Co was diffused to the non-magnetic portion A.

Figure 13:
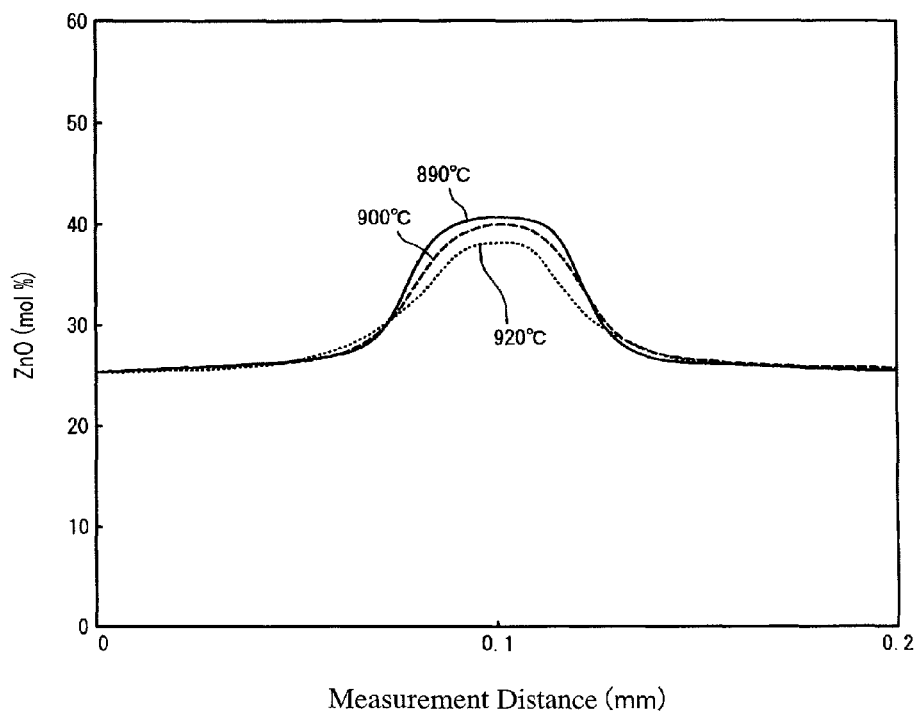
FIG. 13 is a graph showing the relation between the peak sintering temperature and the Zn content distribution.

Because the boundary region B is formed by the diffusion of Zn from the non-magnetic portion A, the thickness of the non-magnetic material sheet 15 forming the non-magnetic portion A is an important parameter. In the case of Sample S1 with the non-magnetic material sheet 15 as thick as 10 μm, the Zn content was 33% by mol (calculated as ZnO) at most, failing to form non-magnetic portions A. As is clear from FIG. 13 showing the relation between the peak sintering temperature and the Zn content distribution, the diffusion of Zn increases as the peak temperature elevates from 890° C. to 920° C., resulting in wider boundary regions B. This suggests that the thicknesses of non-magnetic portions A and boundary regions B vary depending on the thickness of non-magnetic material sheets 15, the Zn content, and sintering conditions, which should be properly set. In the case of Sample S1, for instance, the non-magnetic portion A can be formed by properly setting the Zn content in the non-magnetic material sheet 15 and the sintering conditions.

Figure 14:
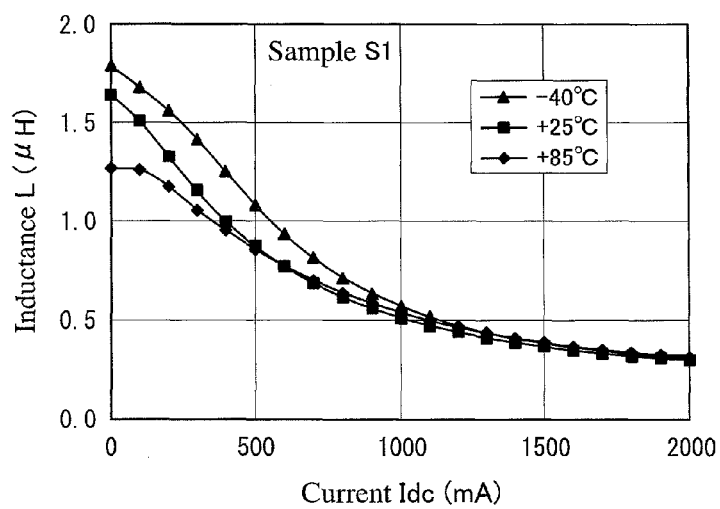
FIG. 14 is a graph showing the DC superimposition characteristics of the multilayer inductor of the present invention (Sample S1).
Figure 15:
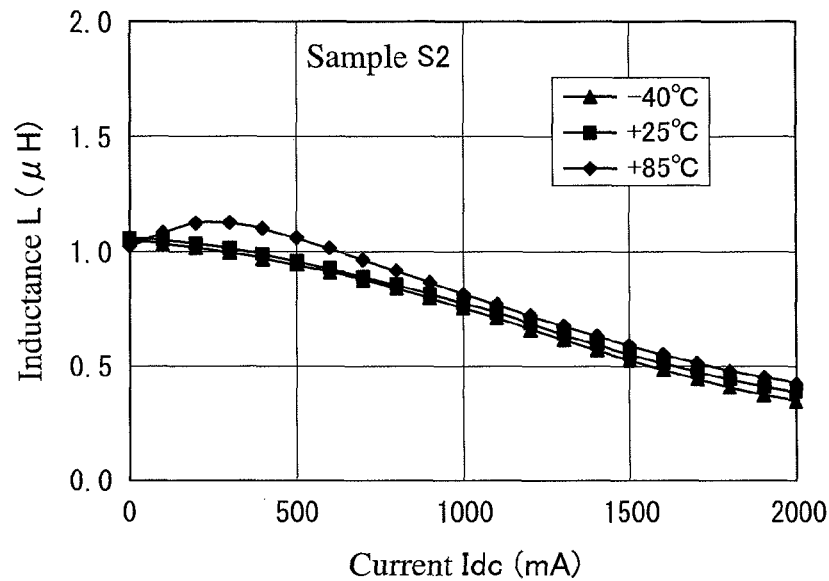
FIG. 15 is a graph showing the DC superimposition characteristics of the multilayer inductor of the present invention (Sample S2).
Figure 16:
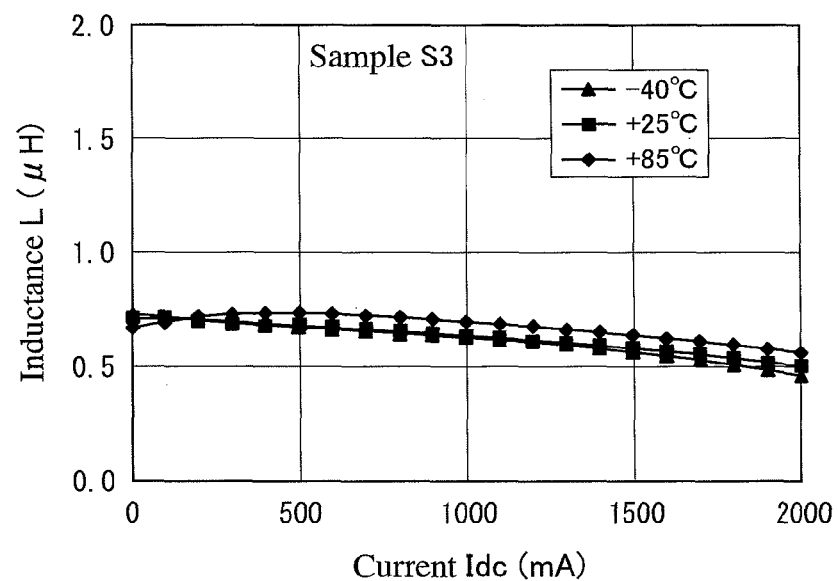
FIG. 16 is a graph showing the DC superimposition characteristics of the multilayer inductor of the present invention (Sample S3).

FIGS. 14-16 show the DC superimposition characteristics of Samples S1-S3. As shown in FIG. 14, Sample S1 comprising a non-magnetic material sheet 15 as thick as 10 μm had no magnetic gap effect, failing to have stable temperature characteristics of inductance at low superimposed current (0-700 mA). As shown in FIGS. 15 and 16, Samples S2 and S3 comprising non-magnetic material sheets 15 as thick as 20 μm and 30 μm, respectively, had stable temperature characteristics of inductance in a wide superimposed current range. Sample S2 had larger inductance than that of Sample S1 at a superimposed current of 500 mA or more, and Sample S3 had larger inductance than that of Sample S1 at a superimposed current of 700 mA or more.

Table 4 shows the DC superimposition characteristics of Sample S1, Table 5 shows the DC superimposition characteristics of Sample S2, and Table 6 shows the DC superimposition characteristics of Sample S3. Inductance change ratios in −40° C. to +85° C. were calculated by the following formula:

Inductance change ratio=$(L2-L1)/L1$, wherein L1 is inductance at +25° C. and L2 is inductance at −40° C. in a temperature range from −40° C. to +25° C., and L1 is inductance at +25° C. and L2 is inductance at +85° C. in a temperature range from +25° C. to +85° C.

TABLE 4

| | Inductance (μH) | | | Inductance Change Ratio (%) | |
| | | | | −40° C. to | +25° C. to |
| Idc(A) | −40° C. | +25° C. | +85° C. | +25° C. | 85° C. |
|---|---|---|---|---|---|
| 0 | 1.263 | 1.637 | 1.787 | −22.8 | 9.2 |
| 0.2 | 1.175 | 1.324 | 1.558 | −11.3 | 17.7 |
| 0.4 | 0.951 | 0.992 | 1.247 | −4.1 | 25.7 |
| 0.6 | 0.772 | 0.767 | 0.933 | 0.7 | 21.6 |
| 0.8 | 0.637 | 0.614 | 0.714 | 3.7 | 16.3 |
| 1.0 | 0.535 | 0.508 | 0.567 | 5.3 | 11.6 |
| 1.2 | 0.471 | 0.439 | 0.471 | 7.3 | 7.3 |
| 1.4 | 0.409 | 0.387 | 0.405 | 5.7 | 4.7 |
| 1.6 | 0.369 | 0.351 | 0.357 | 5.1 | 1.7 |
| 1.8 | 0.338 | 0.323 | 0.323 | 4.6 | 0.0 |
| 2.0 | 0.314 | 0.301 | 0.297 | 4.3 | −1.3 |

TABLE 5

| | Inductance (μH) | | | Inductance Change Ratio (%) | |
| | | | | −40° C. to | +25° C. to |
| Idc(A) | −40° C. | +25° C. | +85° C. | +25° C. | 85° C. |
|---|---|---|---|---|---|
| 0 | 1.026 | 1.055 | 1.058 | −2.7 | 0.3 |
| 0.2 | 1.126 | 1.035 | 1.014 | 8.8 | −2.1 |
| 0.4 | 1.100 | 0.984 | 0.968 | 11.8 | −1.7 |
| 0.6 | 1.014 | 0.924 | 0.911 | 9.7 | −1.5 |
| 0.8 | 0.916 | 0.855 | 0.839 | 7.1 | −1.8 |
| 1.0 | 0.812 | 0.771 | 0.753 | 5.3 | −2.4 |
| 1.2 | 0.718 | 0.682 | 0.659 | 5.3 | −3.3 |
| 1.4 | 0.626 | 0.588 | 0.565 | 6.5 | −4.0 |
| 1.6 | 0.546 | 0.507 | 0.478 | 7.8 | −5.7 |
| 1.8 | 0.477 | 0.437 | 0.403 | 9.1 | −7.8 |
| 2.0 | 0.417 | 0.377 | 0.339 | 10.5 | −10.1 |

TABLE 6

| | Inductance (μH) | | | Inductance Change Ratio (%) | |
| | | | | −40° C. to | +25° C. to |
| Idc(A) | −40° C. | +25° C. | +85° C. | +25° C. | +85° C. |
|---|---|---|---|---|---|
| 0 | 0.670 | 0.711 | 0.733 | −5.8 | 3.1 |
| 0.2 | 0.718 | 0.704 | 0.703 | 2.0 | −0.1 |
| 0.4 | 0.735 | 0.688 | 0.680 | 6.8 | −1.2 |
| 0.6 | 0.730 | 0.672 | 0.662 | 8.6 | −1.5 |
| 0.8 | 0.716 | 0.654 | 0.645 | 9.5 | −1.4 |
| 1.0 | 0.695 | 0.634 | 0.626 | 9.6 | −1.3 |
| 1.2 | 0.678 | 0.618 | 0.606 | 9.7 | −1.9 |
| 1.4 | 0.652 | 0.594 | 0.582 | 9.8 | −2.0 |
| 1.6 | 0.626 | 0.569 | 0.551 | 10.0 | −3.2 |
| 1.8 | 0.597 | 0.539 | 0.511 | 10.8 | −5.2 |
| 2.0 | 0.564 | 0.506 | 0.463 | 11.5 | −8.5 |

Instead of providing the inductor with one non-magnetic portion (magnetic gap), pluralities of non-magnetic material sheets 15 may be used to disperse magnetic gaps in a lamination direction. In this case, some of the magnetic gaps may be formed by non-magnetic ceramics such as $ZrO_2$, etc.

COMPARATIVE EXAMPLE 1

Figure 17:
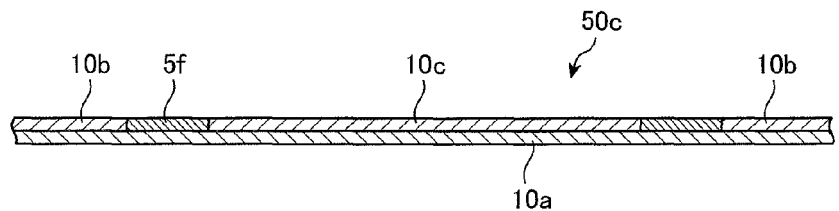
FIG. 17 is a cross-sectional view showing a third composite sheet used in Comparative Example 1.

As shown in FIG. 17, a magnetic material sheet 10a having the same thickness of 30 μm as in Example 1 was provided with a conductor pattern 5f as thick as 10 μm, and printed with a magnetic material paste having the same thickness as that of the conductor pattern 5f outside the conductor pattern 5f, and also printed with a $ZrO_2$ paste having the same thickness as that of the conductor pattern 5f inside the conductor pattern 5f to form a third composite sheet 50c. Three third composite sheets 50c were laminated to produce a multilayer inductor (Sample S4) having three magnetic gaps ($ZrO_2$) as thick as 30 μm in total.

Figure 18:
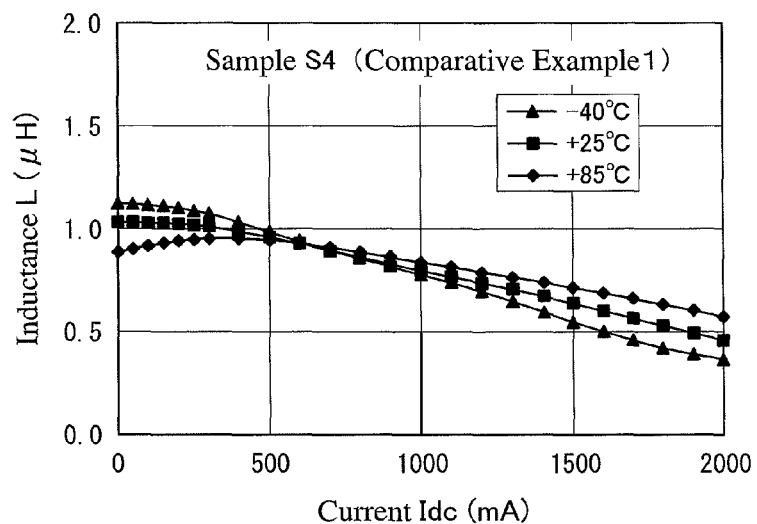
FIG. 18 is a graph showing the DC superimposition characteristics of the conventional multilayer inductor of Comparative Example 1.

The quantitative determination of Zn by EPMA as in Example 1 revealed that in Comparative Example 1, Zn was diffused from the magnetic portion C to the non-magnetic portion A of $ZrO_2$, with a smaller Zn content on the magnetic portion side in the boundary regions B, opposite to the present invention. The DC superimposition characteristics of Sample S4 are shown in FIG. 18 and Table 7. There was large inductance change with the temperature in DC superimposed current ranges outside 500-1000 mA.

TABLE 7

| | Inductance (μH) | | | Inductance Change Ratio (%) | |
|---|---|---|---|---|---|
| | | | | −40° C. to | +25° C. to |
| Idc(A) | −40° C. | +25° C. | +85° C. | +25° C. | +85° C. |
| 0 | 0.885 | 1.027 | 1.124 | −13.8 | 9.5 |
| 0.2 | 0.941 | 1.025 | 1.103 | −8.1 | 7.6 |
| 0.4 | 0.952 | 0.987 | 1.033 | −3.6 | 4.6 |
| 0.6 | 0.927 | 0.925 | 0.942 | 0.3 | 1.8 |
| 0.8 | 0.887 | 0.857 | 0.858 | 3.5 | 0.1 |
| 1.0 | 0.838 | 0.795 | 0.777 | 5.4 | −2.2 |
| 1.2 | 0.788 | 0.735 | 0.693 | 7.1 | −5.8 |
| 1.4 | 0.738 | 0.672 | 0.596 | 9.9 | −11.3 |
| 1.6 | 0.687 | 0.602 | 0.500 | 14.1 | −17.0 |
| 1.8 | 0.631 | 0.528 | 0.421 | 19.5 | −20.4 |
| 2.0 | 0.569 | 0.458 | 0.365 | 24.4 | −20.2 |

Effect of The Invention

Having a magnetic gap having effective thickness variable with the temperature and the relative temperature coefficient $\alpha\mu_{ir}$ of initial permeability of magnetic ferrite set in a desired range, the multilayer inductor of the present invention has stable inductance against temperature change and excellent DC superimposition characteristics, as well as low loss near switching frequencies and little variation of characteristics by stress.

What is claimed is:

1. A multilayer inductor comprising a magnetic portion, a coil embedded in said magnetic portion, and a non-magnetic portion constituting a magnetic gap for said coil,
   said magnetic portion being made of Ni ferrite, whose relative temperature coefficient $\alpha\mu_{ir}$ of initial permeability at a frequency of 1 MHz is in the range of 10 ppm/° C. $< \alpha\mu_{ir} \leq 40$ ppm/° C. between −40° C. and +80° C.,
   said non-magnetic portion being made of Zn ferrite containing more Zn
   than in said magnetic portion and having a Curie temperature Tc of −50° C. or lower, and
   the change ratio of initial inductance at superimposed current of 0 A being within ±7% between −40° C. and +85° C.

2. The multilayer inductor according to claim 1, wherein said magnetic portion is made of Ni ferrite comprising as main components 45-50% by mol of $Fe_2O_3$, 15-30% by mol of ZnO, 5-15% by mol of CuO, and more than 0% and 1.2% or less by mol of CoO, the balance being NiO.

3. The multilayer inductor according to claim 2, wherein said magnetic portion comprises as sub-components 3% or less by mass (calculated as $SnO_2$) of Sn and/or 1% or less by mass (calculated as MnO) of Mn, based on 100% by mass of the main components.

4. The multilayer inductor according to claim 1, wherein said non-magnetic portion is made of Zn ferrite comprising as main components 43-50% by mol of $Fe_2O_3$, 37-50% by mol of ZnO, and 0-15% by mol of CuO.

5. A power converter comprising the multilayer inductor recited in claim 1, a switching device, and a control circuit for said switching device.

* * * * *